3,128,148
BOILING AQUEOUS ORGANIC LIQUID ENHANCEMENT OF HIGH ACETYL CELLULOSE ACETATE PRODUCTS FLOW POINT AND WRINKLE RECOVERY
Louis D. Moore, Jr., Roger M. Schulken, Jr., and John W. Tamblyn, Kingsport, Tenn., assignors to Eastman Kodak Company, Rochester, N.Y., a corporation of New Jersey
No Drawing. Filed Feb. 6, 1957, Ser. No. 638,443
7 Claims. (Cl. 8—131)

This invention relates to a process for improving cellulose acetate products such as fibers, films and the like. More particularly this invention concerns a chemical treatment of high acetyl cellulose acetate products whereby the flow point and wrinkle recovery properties are enhanced and other features of the product are improved.

The manufacture of products such as yarns and sheeting from cellulose acetate has been carried out for many years. Such prior art cellulose products have been after processed in many ways. However, the prior art has been, to a substantial extent, concerned with products made from cellulose acetate having a relatively low acetyl content, namely an acetyl content below 40%. This prior art type of cellulose acetate is sometimes known as acetone soluble cellulose acetate.

In more recent years there has come into use in industry cellulose acetate products made from cellulose acetate having an acetyl content usually greater than 40%. This high acetyl type of cellulose acetate is sometimes referred to in the art as cellulose triacetate.

While such high acetyl cellulose acetate is presently used for the production of fibers and film and has merit for such uses, the utility of high acetyl cellulose acetate products could in certain instances be extended provided certain properties thereof might be improved. In order to accomplish such improvement several processes have already been proposed in the prior art, which in essence involve the heat treatment of such high acetyl cellulose acetate products. Although the prior art heat treatment processes improve some of the properties of the high acetyl cellulose acetate-containing compositions, in many instances the heat treatment causes considerable loss in the toughness of the product. Also, heat treatment processes may be somewhat expensive to apply to such products, as well as difficult to control the exact heat treatment.

Therefore, it is apparent that the development of a procedure for treating products made from high acetyl cellulose acetate wherein certain of the deficiencies of prior art methods are obviated or minimized, represents a highly desirable result. After extended investigation we have found a chemical method of after treatment for products from high acetyl cellulose acetate, which chemical method is believed to represent an improvement over prior art methods heretofore utilized.

This invention has for one object to provide an after treatment method which may be applied to products manufactured from high acetyl cellulose acetate for improving certain properties of such products. Another object is to provide a chemical method for the treatment of high acetyl cellulose acetate products as contrasted to heat treatment methods now employed. Still another object is to provide an after treatment of the chemical type which may be applied to yarns and sheeting manufactured from high acetyl cellulose acetate which will improve various properties such as the flow point, ironing temperature and the like. Still another object is to provide an after treatment process of the class indicated which is relatively simple and economical to operate, particularly as compared with existing processes. Other objects will appear hereinafter.

We have found that products manufactured from high acetyl cellulose acetate in various forms, such as in the form of fibers, yarns, sheets and the like, may be subjected to a brief treatment with certain chemicals under predetermined conditions of time and temperature as will be set forth in detail hereinafter with the result that the yarn and film have imparted thereto enhanced properties. We have found in particular that exposing said high acetyl cellulose acetate products to contact with the particular chemical solution comprising heated aqueous phenol of a certain concentration for a few minutes time brings about an improvement in flow point and the like properties without a material loss in toughness of the product. In general any reduction in the toughness properties occasioned by the process of the present invention would be somewhat less than the corresponding loss by prior art heat treatment methods. We have further found that chemical treatments in accordance with the present invention apparently change the crystallinity of the high acetyl cellulose acetate product and that there apparently is a relationship between this crystallinity change and the improvement in properties. Expressed in another way, we have found that the several chemical treating agents which will be described in detail hereinafter exhibit the capability of changing the crystalline structure of the high acetyl cellulose acetate to some degree. It will be noted though as the description proceeds that certain chemicals are preferred over others in that their effect on the internal crystalline structure of the high acetyl cellulose acetate may be more pronounced than some of the chemicals which are regarded of lesser importance for use in the present invention.

The change in crystallinity to which we refer is an effect which may be measured by X-ray in accordance with standard practice, as follows:

The samples to be compared are subjected separately to exposure to a beam of X-rays. Photographic film is placed in the path of the X-ray beam with the sample located between the film and the X-ray source. Appropriate exposure and development of the film produces a diffraction pattern of rings, arcs, or spots characteristic of the particular sample. The degree of sharpness (lack of diffuseness) of the rings or arcs is a measure of the crystallinity of the sample under study. Comparison of such X-ray patterns before and after treatment affords a measure of the change in crystallinity imparted to a sample by the treatment.

While, as just indicated, in accordance with the preferred embodiment of the present invention we would utilize aqueous phenol under certain conditions of concentration, time and temperature, there are certain other chemicals which also appear to function in a similar manner on high acetyl cellulose acetate products. Brief data concerning phenol as well as some of these other chemicals is tabulated below:

| Chemical Additive | Concentration, percent | X-Ray Crystallinity |
|---|---|---|
| None | | Very low. |
| Phenol | 10 | High. |
| Do | 2 | Moderate. |
| n-amyl Acetate | 10 | Do. |
| γ-butyrolactone | 10 | Do. |
| Ethyl acetate | 10 | High. |
| 2-Chloroethanol | 10 | Moderate. |
| Tri-fluoro acetic acid | 10 | Do. |
| Cyclohexanone | 5 | High. |
| Pyrrole | 10 | Do. |

Therefore, in the broader aspects of our invention our chemical after treatment comprises boiling the article made from cellulose acetate of high acetyl content in an aqueous solution which contains more than 1% of the particular chemicals to be described herein, and in some instances the concentration of the chemical may be up to 25% as will be apparent from the examples. However, in most instances we prefer to employ a concentration of the chemical between 2–10%. The percentage expression as used to define concentration is the the percentage of the total volume of the solution (usually in water) which is composed of those chemical additives which are liquids at room temperature. For chemical additives which are solids at room temperature the percentage expression is used to denote the weight in grams of the additive which is dissolved in 100 ml. of the solvent (usually water).

The time for the treatment of the high acetyl product in the chemical solution is usually greater than one minute and may in some instances extend to thirty minutes. However, usually a period of treatment for 5–15 minutes will be satisfactory.

A still further understanding of our invention will be had from a consideration of the following examples which are set forth for illustrating certain embodiments of operation.

Example I

In this example the high acetyl cellulose acetate product which was subjected to an after treatment, was comprised of a thin film. This film was made from cellulose acetate having approximately 41.3% acetyl. This cellulose acetate was dissolved in a 9:1 methylene chloride-methanol solvent and the thin film cast in a conventional manner. The film as cast was substantially amorphous. Strips of the film were boiled for five minutes in chemical solutions of 2% phenol and 25% acetone. The results of these treatments as compared with controls, are set forth below.

| Treatment: | X-ray crystallinity |
|---|---|
| As cast | Zero. |
| Boiled five minutes in water | Zero. |
| Boiled five minutes in 2% phenol | High. |
| Boiled five minutes in 25% acetone | High. |

Example II

In accordance with this example the product of high acetyl cellulose acetate which was treated in the present example comprised yarn. The acetyl content in this yarn product was considerably above 40%. Separate samples of this same yarn were not only subjected to chemical treatment in accordance with the present invention, but other samples, for comparison purposes, were subjected to prior art heat treatment methods. It is desired to point out that the samples which were heat treated represent the best values which were obtained by prior heat treatment methods rather than an average value from prior art heat treatments. In other words, many tests on heat treatment alone failed to give values as good as the values which are set forth in the present example. The results of these runs are tabulated below:

| Treatment | Tenacity, grams/denier | Elongation in percent | Flow point under load of 0.05 g./denier in °C. |
|---|---|---|---|
| None | 1.23 | 30.8 | 246 |
| Boiled 5 min. in 2% phenol | 1.06 | 32.4 | 268 |
| Boiled 5 min. in 25% acetone | 1.11 | 32.4 | 276 |
| Heat set at 200° C. for 8 min | 1.01 | 27.0 | 258 |
| Heat set at 210° C. for 4 min | 0.97 | 22.6 | 263 |
| Heat set at 220° C. for 2 min | 1.05 | 26.8 | 260 |
| Heat set at 230° C. for 1 min | 0.91 | 18.2 | 253 |

It will be observed from the above data that the high acetyl yarn treated in accordance with the present invention exhibited a much enhanced flow point. It is also evident that the chemical treatment is not nearly so detrimental to the physical properties of the yarn as the dry heat treament.

Example III

In this example the product treated comprised a fabric known as cellulose triacetate fabric. The fabric was after treated with a 2% aqueous phenol solution in accordance with the present invention. For the purposes of comparison, treatment in a dye bath for a comparable period of one hour was also carried out. The percentage wrinkle recovery on the samples tested was measured, with the results indicated in the following table, each entry representing the average of 3 runs:

| Treatment | Percent Recovery Warp Direction | Percent Recovery Fill Direction |
|---|---|---|
| Boiled in dye bath for 1 hr | 83.3 | 79.8 |
| Boiled in dye bath containing 2% phenol for 1 hr | 85.9 | 84.3 |
| Boiled in 2% phenol for 5 min. then in dye bath for 1 hr | 85.7 | 85.2 |

While on inspection it may appear that the percentage difference utilizing the present invention is of not too great a magnitude, statistical analysis has shown this percentage difference to represent a significant improvement at the 99% confidence level.

The measurement of wrinkle recovery is made by applying a given weight for 5 minutes to a fold in a strip of fabric, hanging one end of the fabric up, letting the other hang loose by its own weight and measuring over a period of 5 minutes the amount of recovery. This is done by measuring the angle formed at the original fold, a 180° angle representing 100% recovery. This measurement gives an indication of the extent to which the wrinkles in a garment will "fall out" on hanging overnight on a clothes hanger. It also should be related to the "wash and wear" or "ease of care" characteristics exhibited by some synthetic yarn apparel.

Example IV

In accordance with this example the product treated by the present invention comprised cellulose acetate yarn having an acetyl content substantially in excess of 40%. The yarn was treated with our preferred chemical treating agent, aqueous phenol, in various concentrations. From the results tabulated below it is apparent that when using concentrations of chemical agent in the amount of 1% and above, that the bar-sticking temperature of the yarn is enhanced. In general in the treatment of yarn, while concentrations between 1 and 10% may be employed, usually concentrations between 1–5% are preferred.

| Phenol Concentration, Percent | X-Ray Crystallinity | Tenacity, g./Den. | Elongation, Percent | Bar-Sticking Temperature, °C. |
|---|---|---|---|---|
| 3 | High | 0.94 | 36 | 229–244 |
| 2 | Moderate | 1.04 | 33 | 219–244 |
| 1 | Slight | 1.01 | 28 | 180–226 |
| 0.5 | Very slight | 1.12 | 34 | 178–186 |
| 0.25 | None | 1.06 | 32 | 178–196 |
| 0.1 | do | 1.08 | 32 | 178–194 |

Example V

In accordance with this example a high acetyl cellulose acetate yarn as in Example IV was used and the conditions of treatment were otherwise similar to the preceding example excepting that the chemical treating agent employed was ethyl acetate. The results of these tests are set forth in the following table:

| Ethyl Acetate Concentration, Percent | X-Ray Crystallinity | Bar-Sticking Temperature | Remarks |
|---|---|---|---|
| 0 | None | | Flow point, 252° C. |
| 2 | do | 178–196 | |
| 4 | do | 178–236 | Flow point, 262° C. |
| 6 | High | 188–252 | Flow point, 271.7° C. |
| 8 | do | 180–262 | Flow point, 270.3° C. |
| 10 | do | 238–253 | Yarn was stiff and brittle. |

It is apparent from these data that improvement in the flow point was obtained at about 4% concentration. At 10% concentration the bar-sticking temperature and flow point were still improved but there was some evidence that the yarn was becoming brittle. Therefore, with this particular chemical treating agent we would prefer to employ concentrations below 10% in most instances.

*Example VI*

In accordance with this example the product treated by the present invention comprised film samples of a cellulose acetate containing 41.3% acetyl. Pieces of the film were after treated with a 2% aqueous phenol solution and an aqueous acetone solution in accordance with the present invention. The treated film was then tested for improvement in heat distortion characteristics. For the purposes of comparison an untreated film was also run. The results of these runs and tests are set forth below:

| Treatment | Tensile Strength, p.s.i. | Elongation, Percent | 2% Heat Distortion Temperature With Loading of 25 p.s.i., °C. | X-Ray Crystallization |
|---|---|---|---|---|
| None | 14,300 | 32.3 | 153 | None. |
| Boiled 15 min. in acetone; water mixture having a boiling point between 70° and 75° C. | 11,600 | 54.5 | 246 | Moderate. |
| Boiled 15 min. in 2% aqueous phenol. | 11,200 | 42.0 | [1] 196 | Do. |

[1] If instead of 2% distortion, 3% were chosen, this figure would be about 250° C. whereas the other two values would be increased only a very few degrees.

From these data it will be observed that the treatments improved the heat distortion properties not only at 2% distortion, but more so at 3%.

It is believed apparent from the preceding description that we have provided a process for the chemical after treatment of various products, particularly yarn and film, which is relatively simple to apply and which improves various properties of said products. As already indicated above, usually the use of chemical concentrations of a few percent with a few minutes of treatment is satisfactory. However, it may be noted from the examples that it is possible to extend the time of treatment to as much as an hour. Also, the concentrations of the treating agents may be increased in some instances but with respect to the preferred agent, phenol, generally its concentration would be maintained below 10%.

The acetyl content referred to herein may be determined in the usual manner now used in the industry and the term is used in the usual sense that it is presently used in the industry. That is, the acetyl content is calculated on the basis of the percent by weight of the functional group $CH_3CO$—. A theoretical triacetate would contain about 44.8% acetyl. The number of unreacted groups which may be calculated form the difference between 44.8% and the actual acetyl content, are composed of the original hydroxyl groups in the cellulose.

The present invention has particular utility in treating the type of yarn known as cellulose triacetate yarn to improve the ironing temperature and flow point thereof. By the present invention it is possible to obtain such improvements with a relatively slight loss of physical toughness of the yarn. Also, the simplicity and ease of control of the present invention when applying the present process to the after treatment of various products is thought to constitute an improvement over the types of after treatments now in use.

We claim:

1. The process for the after treatment of products from the group consisting of solid fibers, films, yarns and fabrics, formed from high acetyl cellulose acetate to increase the crystallinity thereof without substantial loss of toughness of the product, said cellulose acetate being substantially uncrystallized and containing more than 40% acetyl calculated on the basis of the percent by weight of the functional group $CH_3CO$— and being capable of undergoing a crystallinity change, which consists of the steps of immersing the product of said uncrystallized cellulose acetate in an aqueous liquid solution at a boiling temperature and containing 2–25% of a chemical from the group consisting of phenol, n-amyl acetate, γ-butyrolactone, ethyl acetate, 2-chloroethanol, tri-fluoro acetic acid, cyclohexanone and pyrrole which solution has the property of altering the crystallinity of said high acetyl cellulose acetate, maintaining the product in contact with the boiling solution for a few minutes up to 60 minutes until the crystallinity is increased, but not for a long enough period to impair the physical make-up of said product, removing the product from the liquid, washing and drying the product.

2. The process step for the after treatment of a product from the group consisting of solid fibers, films, yarns and fabrics essentially composed of cellulose acetate containing more than 40% acetyl calculated on the basis of the percent by weight of the functional group $CH_3CO$—, the cellulose acetate being of a substantially uncrystallized structure which consists of immersing said product in an aqueous boiling phenol solution of a 1–10% concentration for greater than 1 and up to 30 minutes whereby the crystallinity of the cellulose acetate is increased without material loss of toughness.

3. The process step for the after treatment of a product from the group consisting of solid fibers, films, yarns and fabrics essentially composed of cellulose acetate containing more than 40% acetyl calculated on the basis of the percent by weight of the functional group $CH_3CO$—, the cellulose acetate being of a substantially uncrystallized structure, which consists of immersing the product in an aqueous solution of boiling ethyl acetate solution of a concentration of 2–10% for 5–15 minutes until the crystallinity of the cellulose acetate making up the product is increased but not for a long enough period to impair the physical make-up of said product.

4. The after treatment process steps for treating cellulose acetate film containing at least a 40% acetyl content calculated on the basis of the percent by weight of the functional group $CH_3CO$—, the cellulose acetate being of a substantially uncrystallized structure, which consists of boiling said film in an aqueous solution containing 1–10% phenol for about 5 to 15 minutes until the crystallinity of the cellulose acetate is increased to a desired extent as determinable by X-ray and thereafter removing, washing, and drying the treated film.

5. The process in accordance with claim 4 wherein the phenol concentration is approximately 2% and the time of boiling is approximately 5 minutes.

6. The process step of improving the wrinkle recovery of a high acetyl cellulose acetate fabric having an acetyl content greater than 40% calculated on the basis of the percent by weight of the functional group $CH_3CO$—, and wherein the cellulose acetate is of a substantially uncrystallized structure, which comprises boiling said fabric in an aqueous bath containing 1–10% phenol for 5 to 60 minutes, whereby the wrinkle recovery of the fabric is improved and whereby an increase in crystallinity is imparted to said cellulose acetate.

7. The process step which consists of boiling an unheat treated yarn essentially composed of cellulose acetate containing more than 40% acetyl calculated on the basis of the percent by weight of the functional group $CH_3CO$—, and wherein the cellulose acetate is of a substantially uncrystallized structure, in an aqueous bath containing 1–10% phenol, said boiling being carried out for 5–30 minutes whereby the crystallinity of the cellulose acetate is increased.

References Cited in the file of this patent

UNITED STATES PATENTS

| | | |
|---|---|---|
| 1,826,608 | Ellis | Oct. 6, 1931 |
| 1,984,788 | Ellis | Dec. 18, 1934 |
| 2,073,629 | Ellis | Mar. 16, 1937 |
| 2,202,804 | Wampner | May 28, 1940 |
| 2,277,163 | Sowter | Mar. 24, 1942 |
| 2,862,785 | Finlayson | Dec. 2, 1958 |

FOREIGN PATENTS

| | | |
|---|---|---|
| 259,265 | Great Britain | Sept. 27, 1926 |
| 269,605 | Great Britain | Apr. 11, 1927 |
| 523,425 | Great Britain | July 15, 1940 |

OTHER REFERENCES

Baker: Journal of the American Chemical Society, April 1942, page 776–782.

Fortess: American Dyestuff Reporter, August 1, 1955, pages P524–P537.

Mellor: Journal of Society of Dyers and Colourists, December 1955, pages 817–829.